March 28, 1967 H. BOSMA 3,311,849

BAND LINE CIRCULATOR HAVING EQUAL CAPACITANCES AT EACH PORT IN ORDER TO REDUCE THE OPTIMUM OPERATING FREQUENCY

Filed Dec. 11, 1964

INVENTOR
HENDRIK BOSMA

BY Frank R. Trifari

AGENT 3,311,849

BAND LINE CIRCULATOR HAVING EQUAL CAPACITANCES AT EACH PORT IN ORDER TO REDUCE THE OPTIMUM OPERATING FREQUENCY

Hendrik Bosma, Emmasingel, Eindhoven, Netherlands, assignor to North American Philips Company, Inc., New York, N.Y., a corporation of Delaware Filed Dec. 11, 1964, Ser. No. 417,586
Claims priority, application Netherlands, Dec. 31, 1963, 303,018
4 Claims. (Cl. 333—1.1)

The invention relates to a band line circulator. As is known, the term "band line circulator" is used to denote a non-reciprocal high-frequency device having at least three pairs of terminals (ports) to which transmission lines may be connected and which has the property that with suitable loading the high-frequency energy supplied to a port, neglecting small internal losses, is completely delivered to the next port in cyclic sequence. In principle, the transmission lines may be symmetrical with respect to ground (Lecher lines) the conductors of which may consist, for example, of bands, or asymmetrical, for example coaxial cables or printed circuits. Accordingly, a distinction is made between symmetrical and asymmetrical band line circulators.

In a symmetrical band line circulator, the conductors of a plurality of symmetrical transmission lines are connected with a regular spacing to the circumferences of two circular conductive plates which are arranged parallel to one another and between which is interposed a circular disc of ferrite which is magnetically prepolarized in a direction normal to the planes of the plates.

In an asymmetrical band line circulator, the voltage-carrying conductors of a plurality of asymmetrical transmission lines are connected with regular spacing to the circumference of a circular conductive plate arranged between two ferrite discs which are magnetically prepolarized normally to the plane of the plate and are arranged between two conductive grounded plates connected to the grounded return conductors of the transmission lines. One of the ferrite discs may be omitted.

Such circulators are described in "I.R.E. Transactions," volume MTT–8, No. 3, page 346 (May 1960).

The frequency range in which circulation is produced, that is to say, in which the forward attenuation for the energy transfer between a port and the next port is slight while the energy transfer to the remaining ports is small, that is to say, the isolation is high, in the first instance is determined by the diameter of the ferrite disc and further slightly depends upon the value of the prepolarization and the magnetic properties of the ferrite material.

For conventional ferrite materials, the diameter of the ferrite disc should be about 1/10 of the wavelength of the applied waves in free space. This corresponds to the frequency range in which optimum circulation is produced.

Such circulators are used in practice for comparatively high frequencies which correspond, for example, to wavelengths of the order of 1 decimetre or less. In such cases, the diameter of the ferrite disc is comparatively small, for example, about 3 cm. at a frequency of 1000 mc./s.

In practice, circulators are required for lower frequencies of, for example, 100 mc./s. The diameter of the ferrite disc may be accordingly increased, however, at a frequency of 100 mc./s. this diameter would have to be about 30 cm. and hence the disc would be unwieldy in practice.

In addition, the strength of the prepolarizing field has to be reduced, for the frequency at which magnetic resonance of the material is produced must be of the order of the operating frequency of the circulator. At a small field strength, however, the material is no longer magnetically saturated, resulting in large losses.

Great difficulties are met with in the construction of the magnet which provides the magnetic prepolarization. On the one hand, in view of the large diameter of the ferrite disc the magnet must also have a large size. On the other hand, it is difficult to produce a suffiicently homogeneous prepolarizing field.

The invention obviates said difficulties.

According to the invention, the connecting ports of the circulator are shunted by capacitors.

In order that the invention may be more clearly understood, it will now be described in greater detail with reference to the accompanying drawing, in which.

Figures 1, 2, 3:
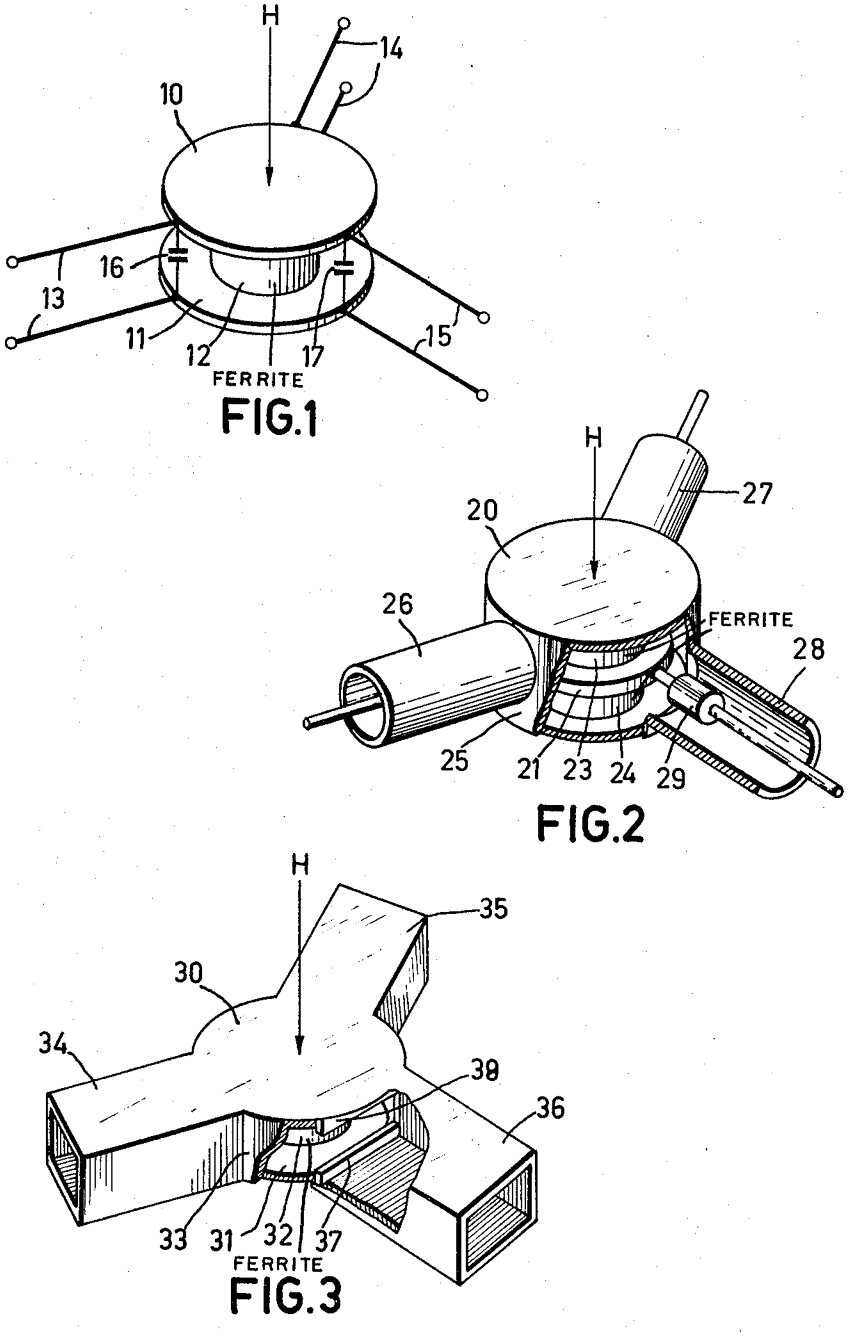
FIG. 1 is a perspective view of a symmetrical band line circulator according to the invention.
FIG. 2 is a perspective partly cut-away view of an asymmetrical band line circulator according to the invention.
FIG. 3 is a perspective partly cut-away view of a band line circulator for waveguide according to the invention.

Referring now to the drawing, and more particularly to FIG. 1, therein is illustrated a band line circulator comprising a pair of circular spaced-apart conductive plates 10 and 11. A circular disc 12 of ferrite material is provided between the plates, and the disc 12 is magnetically prepolarized in a direction normal to the plane of the plates by means of a magnetic field indicated by the arrow H. Symmetrical transmission lines 13, 14 and 15 are connected to the circumference of the plates with equal spacing. According to the invention, the connecting ports of the circulator are shunted by equal capacitors, such capacitors 16 and 17 illustrated in FIG. 1.

FIG. 2 illustrates a band line circulator connected to asymmertical transmission lines, such as coaxial cables. In this arrangement, the circulator comprises three circular spaced-apart conductive plates 20, 21 and 22, with circular discs 23 and 24 of ferrite material between the plates 20 and 21 and the plates 21 and 22, respectively. A magnetic field for prepolarizing the ferrite discs in a direction normal to the plates is indicated by the arrow H. The outer plates 20 and 21 may be connected together by a conductive cylindrical sidewall 25, in which case the diameter of the inner plate 21 is smaller than the diameter of the outer plates. Coaxial cables 26, 27 and 28 are connected to the circulator with equal spacing. The outer conductors of the cables 26, 27 and 28 are connected to the conductive sidewall 25, and the inner conductors of the coaxail cables extend through the sidewall 25 and are connected to the inner conductive plate 21. A capacitor is provided at each port of the circulator, and may be in the form, for example, of an enlarged diameter portion of the inner conductor of each coaxial cable, such as the enlarged portion 29 of the center conductor 28 as shown in FIG. 2.

The band line circulator according to the invention may also be employed in a waveguide system, as illustrated in FIG. 3. In this arrangement, the circulator comprises a pair of circular spaced-apart conductive plates 30 and 31 and a disc 32 of ferrite material 32 provided between the plates. The prepolarizing magnetic fiield normal to the plane of the plates 30 and 31 is indicated by the arrow H. The plates 30 and 31 are connected by conductive cylinder 33. Rectangular waveguides 34, 35 and 36 are connected to equally spaced ports in the cylinder 33. Equal capacitors provided at the ports in the cylinders may comprise, for example, capacitive plates 37 and 38.

Experiments have shown that by this step, with a given diameter of the ferrite disc, the operating frequency, that is to say, the frequency at which optimal circulation is produced and hence the ratio between isolation and forward attenuation is a maximum, may be drastically reduced so that, conversely, for a particular operating frequency the diameter of the ferrite disc can be much smaller than is possible in the known circulators.

Thus, for example, in a three-port circulator having a disc diameter of 42.5 mm. without the use of capacitors the operating frequency was about 750 mc./s., whereas with the use of capacitors of 20 pf. the operating frequency was about 240 mc./s.; with capacitors of 44 pf. the operating frequency was 160 mc./s., with capacitors of 94 pf. 110 mc./s., with capacitors of 120 pf. 100 mc./s. and with capacitors of 136 pf. 95 mc./s.

Thus in the arrangement of the invention the diameter of the ferrite disc may be less than 1/25 of the wavelength of applied oscillations corresponding to the frequency at which the quotient of isolation and forward attenuation is a maximum.

For comparison, it should be mentioned that at an operating frequency of 100 mc./s. the diameter of the ferrite disc would have to be 300 mm. instead of 42.5 mm.

The terminating impedance of the ports in these cases was 50$\omega$ as is normally the case.

At 95 mc./s. the forward attenuation was 1.7 db and the isolation was 10 db. By using a ferrite port which is more suited to this frequency the said values may be further improved.

It has been found that with the comparatively small diameter of the ferrite disc the required pre-polarizing field has a higher value than would be required with a disc of larger diameter.

As a result, the ferrite material is saturated in a higher degree so that the magnetic losses in the circulator also are smaller than would be the case at the same operating frequency without the use of the invention.

What is claimed is:

1. A band line circulator comprising at least one disc of gyromagnetic material, a pair of conductive plates arranged parallel to one another, said disc being positioned between said plates, means for magnetically prepolarizing the disc in a direction normal to the plane of the plates, the outer edges of the plates having at least three connecting ports for the connection of transmission lines, said ports being equally spaced from one another, comprising equal capacitors shunting said ports, said capacitors having impedances less than the terminating impedance of said ports at the operating frequency at which optimum circulation occurs.

2. A band line circulator as claimed in claim 1, characterized in that the diameter of the ferrite disc is less than 1/25 of the wavelength corresponding to said operating frequency.

3. A band line circulator comprising a pair of conductive parallel spaced-apart plates, a disc of ferrite material positioned between said plates, means for magnetically prepolarizing said disc in a direction normal to the plane of said plates, means providing at least three symmetrically located connecting ports between said plates at the outer preiphery thereof, a separate transmission line connected to each of said ports, and equal capacitor means connected to shunt each of said ports, said capacitor means having impedances less than the terminating impedances of said lines at the operating frequency of optimum circulation in said circulator.

4. A band line circulator comprising at least two parallel spaced-apart circular conductive plates, a disc of ferrite material mounted between said two plates, means for magnetically prepolarizing said disc in a direction normal to the plane of said plates, means providing at least three connecting ports between said plates at the outer periphery thereof, said ports being symmetrically located, a separate transmission line connected to each of said ports, and equal capacitor means connected to shunt each of said ports whereby the frequency at which circulation is produced by said circulator is reduced for a given diameter of disc and given magnitude of said prepolarizing field, said capacitor means having impedances less than the terminating impedance of said lines at said frequency, said disc having a diameter less than 1/25 of the wavelength corresponding to said frequency.

References Cited by the Examiner

UNITED STATES PATENTS

| | | | |
|---|---|---|---|
| 3,085,212 | 4/1963 | Clark et al. | 333—1.1 |
| 3,165,711 | 1/1965 | Drumheller et al. | 333—1.1 |

HERMAN KARL SAALBACH, *Primary Examiner.*

P. L. GENSLER, *Assistant Examiner.*